Patented Oct. 24, 1933

1,931,826

UNITED STATES PATENT OFFICE 1,931,826

COMPOUND OF THE CARBAZOLE-3.6-DISULPHONIC ACIDS SERIES

Friedrich Muth and Albert Schmelzer, Elberfeld, Germany, assignors to General Aniline Works, Inc., New York, N. Y., a corporation of Delaware No Drawing. Application November 26, 1930, Serial No. 498,506, and in Germany May 13, 1927

5 Claims.  (Cl. 260—46)

The present invention relates to new compounds of the carbazole series and more particularly it relates to new 1-nitro and 1-amino-carbazole-3.6-disulphonic acids of the following general formula:—

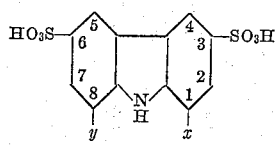

wherein $x$ means the nitro or amino group, $y$ stands for the sulphonic acid group, hydrogen, the alkyl group, the hydroxy alkyl group, halogen, cyanogen, the carboxylic acid group, the thioalkyl group, the sulphydryl group or —S—S—R, R representing the above designated carbazole nucleus. These new compounds form white to yellow crystals being soluble in water in form of their alkali metal salts and are valuable intermediate products in the manufacture of dyestuffs, especially for preparing unsulphonated carbazole compounds by splitting off the sulphonic acid group in weakly acid solution by heating under pressure. The general way to prepare these new compounds is by nitrating in the manner known per se a compound of the general formula:—

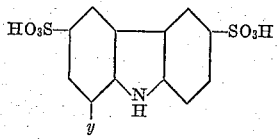

wherein $y$ has the same meaning as indicated above. In some cases it may be advantageous to sulphonate a compound of the general formula:—

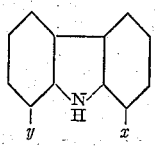

wherein $x$ and $y$ have the same meaning as indicated above according to the usual methods. The two sulphuric acid groups enter the molecule in 3- and 6-position. The amino compounds are prepared by reduction of the nitro group in the known manner. It is evident that substitution products of the amino group as methylamino compounds or acetylamino compounds can also be prepared in the known manner.

The following examples illustrate our invention without restricting it thereto, the parts being by weight:—

*Example 1*:—167 parts of carbazole are converted into carbazole-3.6.8-trisulphonic acid; the sulphonating mixture is diluted by the addition of ice until it is equal to a sulphuric acid of about 63° Bé. Thereafter 96.5 parts of nitric acid (spec. grav. 1,4) which are dissolved in 290 parts of concentrated sulphuric acid are dropped in while stirring at a temperature below 0° C. After one night's standing the nitration mixture is poured on to ice and the 1-nitrocarbazole-3.6.8-trisulphonic acid produced is salted out by means of sodium chloride. The disodium salt is readily soluble in water; it crystallizes from 50% ethanol in yellow long small needles.

In the same manner 8-alkyl-1-nitrocarbazole-3.6-disulphonic acid is prepared by starting with an 8-alkylcarbazole as, for instance, 8-methylcarbazole. The 8-alkyl-1-nitrocarbazole-3.6-disulphonic acids are in form of their alkali metal salts well crystallizing yellow compounds which dissolve in water. The respective hydroxy alkyl compounds are prepared from the respective 8-hydroxycarbazole compounds by alkylation in the known manner and nitration as described above. So, for example, 8-methoxy-1-nitrocarbazole-3.6-disulphnoic acid is prepared by methylation of 8-hydroxycarbazole-3.6-disulphonic acid (described in the German Patent 258,298) by means of dimethylsulphate and subsequent nitration.

The respective halogen and cyanogen compounds are, for instance, obtainable by direct halogenation of carbazole-3.6-disulphonic acid or by diazotizing the 8-aminocarbazole-3.6-disulphonic acid and changing the amino group for halogen or cyanogen according to the reaction of Sandmeyer and subsequent nitration. The carbazole-8-carboxylic-3.6-disulphonic acid is obtained, for instance, by sulphonating the carbazole-1-carboxylic acid (Gazz. chim. ital. 12,272). By subsequent nitration the 1-nitrocarbazole-8-carboxylic-3.6-disulphonic acid is obtained.

Likewise sulphur containing carbazole compounds are obtainable by the known reactions. 8-aminocarbazole-3.6-disulphonic acid is diazotized. The diazo compound obtained is treated with a xanthogenate and changed for the respective xanthogen ester and by splitting off of the ether group the mercapto compound will be prepared therefrom. The 8-mercaptocarbazole-3.6-disulphonic acid is then nitrated preferably after protecting the SH-group, for instance, by acetylation, which acetyl group can be split off after nitration according to the above described methods, yielding 8-mercapto-1-nitrocarbazole-3.6-disulphonic acid. Thioalkyl compounds are prepared from the mercapto compounds by alkylation in the known manner, for instance, by means of halogeno alkyls. By oxidation of the 8-mercapto compound the respective disulphide is formed, linking two carbazole molecules by the —S—S—bridge in 8.8'-position. All compounds above referred to are in form of their alkali metal salts yellow crystalline substances dissolving in water, splitting off the sulphonic acid groups when heated in acidic solutions under superatmospheric pressure and forming thereby the respective unsulphonated carbazole compounds.

*Example 2:*—150 parts of the disodium salt of 1-nitrocarbazole-3.6.8-trisulphonic acid are dissolved in 300 parts of hot water and dropped into a boiling aqueous mixture of 300 parts of iron and 100 parts of dilute acetic acid. When the reduction is complete the mixture is rendered alkaline with sodium carbonate, filtered from the iron sludge and the filtrate is evaporated. After concentrating considerably the solution is acidified with sulphuric acid. The 1-aminocarbazole-3.6.8-trisulphonic acid crystallizes on cooling as disodium salt in white small needles.

In the same manner the other nitrocarbazole compounds mentioned in Example 1 can be reduced to the respective amino compounds, which amino compounds form white small needles being soluble in water and which likewise split off the sulphonic acid groups under the conditions given for the amino compounds.

*Example 3:*—100 parts of the potassium salt of carbazole-3.6-disulphonic acid are dissolved at 25° C. in 1500 parts of a sulphuric acid of about 63° Bé., cooled to about 0° C. and dropped into a nitration acid containing 17 parts of nitric acid (spec. grav. 1,4) dissolved in 70 parts of concentrated sulphuric acid. After standing for about 12 hours the reaction mixture is poured on to ice and salted out by means of potassium chloride. The new acid crystallizes in long yellow needles. The nitro compound obtained can be reduced as indicated in Example 2. The amino compounds thus obtained crystallizes in long white needles and corresponds to the following formula:

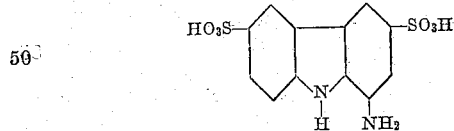

*Example 4:*—100 parts of the potassium salt of 1-nitrocarbazole-3.6-disulphonic acid are dissolved in 1000–1500 parts of an aqueous hydrochloric acid of 10% strength and heated in an enameled autoclave for about 10 hours at a temperature of 170–180° C. The 1-nitrocarbazole is filtered, washed with water, dried and recrystallized from glacial acetic acid or toluene. It forms yellow needles of the melting point 187–188° C.

*Example 5.*—100 parts of 1-nitrocarbazole are dissolved in 700 parts of sulphuric acid of 66° Bé. containing 2 parts of mercuric sulphate, and heated for 4–5 hours at an inner temperature of 100° C. After cooling the sulphonation mixture is poured on to 3000–3500 parts of ice and salted out by means of sodium or potassium chloride. The sodium salt of the new nitro acid possesses the same properties as described in Example 1. By reduction in analogous manner as in Example 2, the 1-aminocarbazole-3.6.8-trisulphonic acid is obtained. The same acid is also obtained by sulphonation of the 1-acetylaminocarbazole.

This is a continuation in part of our co-pending application Serial No. 274,354, filed May 1, 1928.

We claim:—

1. As a new product carbazole disulphonic acid of the probable general formula:—

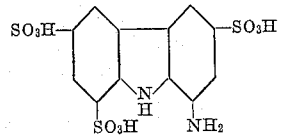

said product being in form of its alkali metal salt a white colored crystalline compound, splitting off the sulphonic acid group when heated in acidic solution under superatmospheric pressure and forming thereby the respective unsulphonated carbazole compound, and being a valuable intermediate product for the preparation of dyestuffs.

2. As a new product carbazole disulphonic acid of the probable formula:—

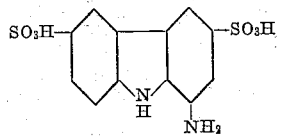

said product being in form of its alkali metal salts a white colored crystalline compound, splitting off the sulphonic acid group when heated in acidic solution under superatmospheric pressure and forming thereby the respective unsulphonated carbazole compound, and being a valuable intermediate product for the preparation of dyestuffs.

3. As a new product carbazole disulphonic acid of the probable formula:—

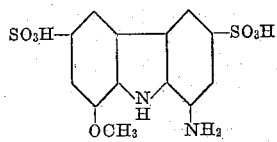

said product being in form of its alkali metal salts a white colored crystalline compound, splitting off the sulphonic acid group when heated in acidic solution under superatmospheric pressure and forming thereby the respective unsulphonated carbazole compound, and being a valuable intermediate product for the preparation of dyestuffs.

4. As new products carbazole disulphonic acids of the probable general formula:

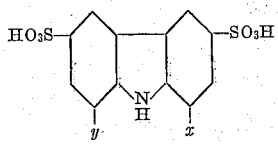

wherein $x$ stands for one of the groups —$NO_2$, —$NH_2$ and $y$ stands for —$SO_3H$, —H, —$CH_3$, —$O.CH_3$, —COOH, —SH, —S—S—R, R representing the above designated carbazole nucleus, said products being in form of their alkali metal salts white to yellow colored crystalline compounds, splitting off the sulphonic acid groups when heated in acidic solutions under superatmospheric pressure and forming thereby the respective unsulphonated carbazole compounds, and being valuable intermediate products for the preparation of dyestuffs.

5. As new products carbazole disulphonic acids of the probable general formula:

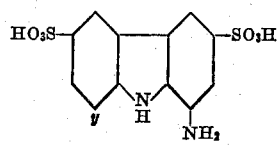

wherein $y$ stands for —$SO_3H$, —H, —$CH_3$, —$O.CH_3$, —COOH, —SH, —S—S—R, R representing the above designated carbazole nucleus, said products being in form of their alkali metal salts white to yellow colored crystalline compounds, splitting off the sulphonic acid groups when heated in acidic solutions under superatmospheric pressure and forming thereby the respective unsulphonated carbazole compounds, and being valuable intermediate products for the preparation of dyestuffs.

FRIEDRICH MUTH.
ALBERT SCHMELZER.